US011140136B1

(12) United States Patent
Li et al.

(10) Patent No.: US 11,140,136 B1
(45) Date of Patent: Oct. 5, 2021

(54) SYSTEMS AND METHODS FOR ENHANCING USER PRIVACY

(71) Applicant: NortonLifeLock Inc., Tempe, AZ (US)

(72) Inventors: Qing Li, Cupertino, CA (US); Chris Ciborowski, San Jose, CA (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 17/006,870

(22) Filed: Aug. 30, 2020

(51) Int. Cl.
H04L 29/06 (2006.01)

(52) U.S. Cl.
CPC ........ H04L 63/0281 (2013.01); H04L 63/101 (2013.01); H04L 63/1408 (2013.01); H04L 63/1475 (2013.01)

(58) Field of Classification Search
CPC ............. H04L 63/0281; H04L 63/1408; H04L 63/101; H04L 63/1475
See application file for complete search history.

(56) References Cited

U.S. PATENT DOCUMENTS

| 8,613,106 B2 | 12/2013 | Bell et al. | |
|---|---|---|---|
| 10,049,231 B2 * | 8/2018 | Flach | H04L 63/0421 |
| 2011/0208850 A1 * | 8/2011 | Sheleheda | G06F 16/9535 709/223 |

OTHER PUBLICATIONS

Amin Faiz Khademi, Browser Fingerprinting: Analysis, Detection, and Prevention at Runtime, Nov. 4, 2014, https://qspace.library.queensu.ca/, pp. 1-111 (Year: 2014).*

Firefox, "How to block fingerprinting with Firefox", URL: https://blog.mozilla.org/firefox/how-to-block-fingerprinting-with-firefox/, Jan. 7, 2020, 5 pages.
Brave, "Brave, Fingerprinting, and Privacy Budgets", URL: https://brave.com/brave-fingerprinting-and-privacy-budgets/, Security & Privacy, Nov. 6, 2019, 16 pages.
"Canvas Fingerprint Defender", URL: https://mybrowseraddon.com/canvas-defender.html, retrieved on Dec. 3, 2020, 4 pages.
"How to block Canvas Fingerprinting in Firefox browser", URL: https://www.thewindowsclub.com/canvas-fingerprinting-blocker-firefox, TheWindowClub, Nov. 17, 2014, 7 pages.

* cited by examiner

*Primary Examiner* — Farid Homayounmehr
*Assistant Examiner* — Suman Debnath
(74) *Attorney, Agent, or Firm* — FisherBroyles, LLP

(57) ABSTRACT

The disclosed computer-implemented method for enhancing user privacy may include (i) intercepting, by a privacy-protecting network proxy, network traffic between a client device and a server device, the client device being protected by a network-based privacy solution that inhibits browser fingerprinting through the privacy-protecting network proxy, (ii) detecting, at the privacy-protecting network proxy, that the network traffic indicates an attempt by a browser fingerprinting service to perform browser fingerprinting on the client device, and (iii) modifying, at the privacy-protecting network proxy based on the detecting of the attempt to perform browser fingerprinting, the intercepted network traffic such that browser fingerprinting performed by the browser fingerprinting service is at least partially inhibited. Various other methods, systems, and computer-readable media are also disclosed.

20 Claims, 7 Drawing Sheets

SYSTEMS AND METHODS FOR ENHANCING USER PRIVACY

BACKGROUND

Browser fingerprinting utilizes multiple data sources on the client browser and operating system in order to identify and track users on the Internet without the use of cookies. Even if a user runs the browser in private or incognito mode, web analytics companies to a reasonably high degree can still track users across the Web by profiling fixed settings on the user's browser and operating system. This data can be gathered from multiple sources, each of which can provide varying degrees of uniqueness. The main vector for deriving these items of information is JavaScript. However, additional information can be obtained from Hypertext Transfer Protocol (HTTP) content, the TCP/IP stack and the Flash Player. Clearly, items such as cookie support provide only a tiny bit of uniqueness while items such as a canvas fingerprint, a user agent, and a list of supported fonts can actually provide a great deal of entropy that can be used to identify the user. This information collection and correlation is a serious challenge to user privacy. The present disclosure, therefore, identifies and addresses a need for systems and methods for enhancing user privacy.

SUMMARY

As will be described in greater detail below, the present disclosure describes various systems and methods for enhancing user privacy. In one example, a computer-implemented method for enhancing user privacy may include (i) intercepting, by a privacy-protecting network proxy, network traffic between a client device and a server device, the client device being protected by a network-based privacy solution that inhibits browser fingerprinting through the privacy-protecting network proxy, (ii) detecting, at the privacy-protecting network proxy, that the network traffic indicates an attempt by a browser fingerprinting service to perform browser fingerprinting on the client device, and (iii) modifying, at the privacy-protecting network proxy based on the detecting of the attempt to perform browser fingerprinting, the intercepted network traffic such that browser fingerprinting performed by the browser fingerprinting service is at least partially inhibited.

In some examples, detecting that the network traffic indicates the attempt by the browser fingerprinting service to perform browser fingerprinting on the client device may include detecting that the client device is attempting to upload data to the browser fingerprinting service at a network location that is previously categorized as being substantially directed to collecting browser fingerprinting data. In one embodiment, the network location may include a domain for the browser fingerprinting service. In one embodiment, the network location is listed on a crowd-sourced list of network locations that are categorized as being substantially directed to collecting browser fingerprinting data.

In some examples, intercepting the network traffic between the client device and the server device may include intercepting the network traffic through a Hypertext Transfer Protocol proxy. In some examples, modifying the intercepted network traffic may include injecting a script into a network payload that is directed to the client device. In one embodiment, the network payload may include a Hypertext Markup Language (HTML) payload. In one embodiment, the script overrides an application programming interface call configured to collect fingerprinting information.

In some examples, modifying the intercepted network traffic may include obfuscating a fingerprinting object that the client device is attempting to upload to the server device. In one embodiment, inhibiting fingerprinting performed by the browser fingerprinting service is performed in a manner that is browser-agnostic.

In one embodiment, a system for implementing the above-described method may include (i) an interception module, stored in memory, that intercepts, as part of a privacy-protecting network proxy, network traffic between a client device and a server device, the client device being protected by a network-based privacy solution that inhibits browser fingerprinting through the privacy-protecting network proxy, (ii) a detection module, stored in memory, that detects, as a part of the privacy-protecting network proxy, that the network traffic indicates an attempt by a browser fingerprinting service to perform browser fingerprinting on the client device, (iii) a modification module, stored in memory, that modifies, at the privacy-protecting network proxy based on the detecting of the attempt to perform browser fingerprinting, the intercepted network traffic such that browser fingerprinting performed by the browser fingerprinting service is at least partially inhibited, and (iv) at least one physical processor configured to execute the interception module, the detection module, and the modification module. In some examples, the detection module detects that the network traffic indicates the attempt by the browser fingerprinting service to perform browser fingerprinting based at least in part on the detection module detecting an instance of common technological DNA that has been previously detected in multiple different and independent browser fingerprinting scripts.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept, by a privacy-protecting network proxy, network traffic between a client device and a server device, the client device being protected by a network-based privacy solution that inhibits browser fingerprinting through the privacy-protecting network proxy, (ii) detect, at the privacy-protecting network proxy, that the network traffic indicates an attempt by a browser fingerprinting service to perform browser fingerprinting on the client device, and (iii) modify, at the privacy-protecting network proxy based on the detecting of the attempt to perform browser fingerprinting, the intercepted network traffic such that browser fingerprinting performed by the browser fingerprinting service is at least partially inhibited.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
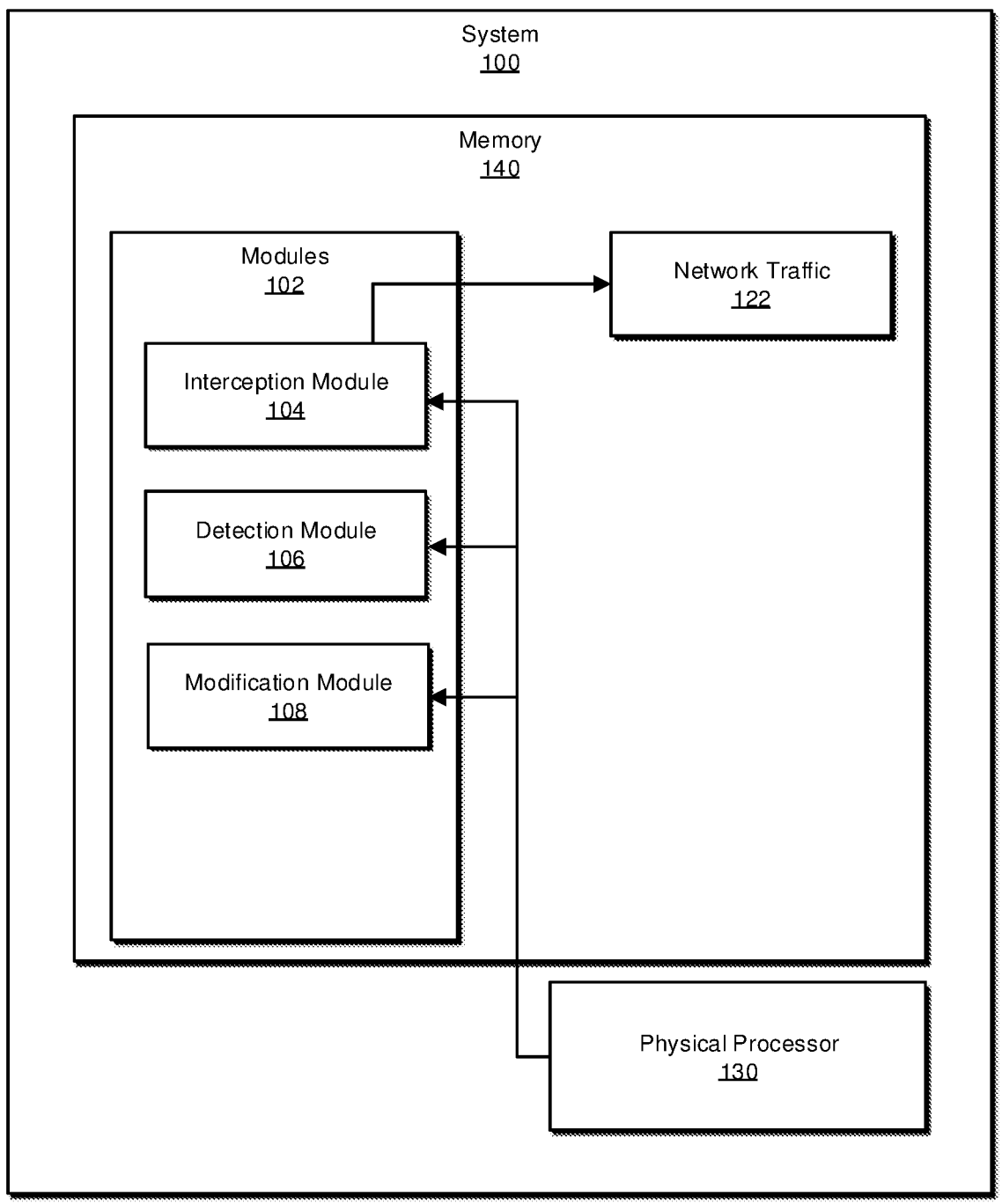
FIG. 1 is a block diagram of an example system for enhancing user privacy.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for enhancing user privacy. The disclosed subject matter may improve upon related technology by relocating privacy-protecting solutions from a client device to a proxy device. Relocating the privacy-protecting solutions to the proxy device may eliminate a cumbersome requirement for the user to configure such solutions at the client device. The relocating process may also enable multiple client devices to be protected by the same proxy device, rather than configuring each client device with a separate local privacy-protecting solution. The disclosed subject matter may also improve upon related technology by leveraging novel and inventive techniques for obfuscating the fingerprinting process. In particular, these techniques may involve modifying web content that is directed to a client device, and that is configured to collect fingerprinting information, such that the actual fingerprinting information becomes distorted or worthless. These techniques may also involve modifying a fingerprinting object that is transmitted from the client device to a fingerprinting service, thereby distorting the object and preventing the fingerprinting service from successfully performing a fingerprinting operation.

Figure 2:
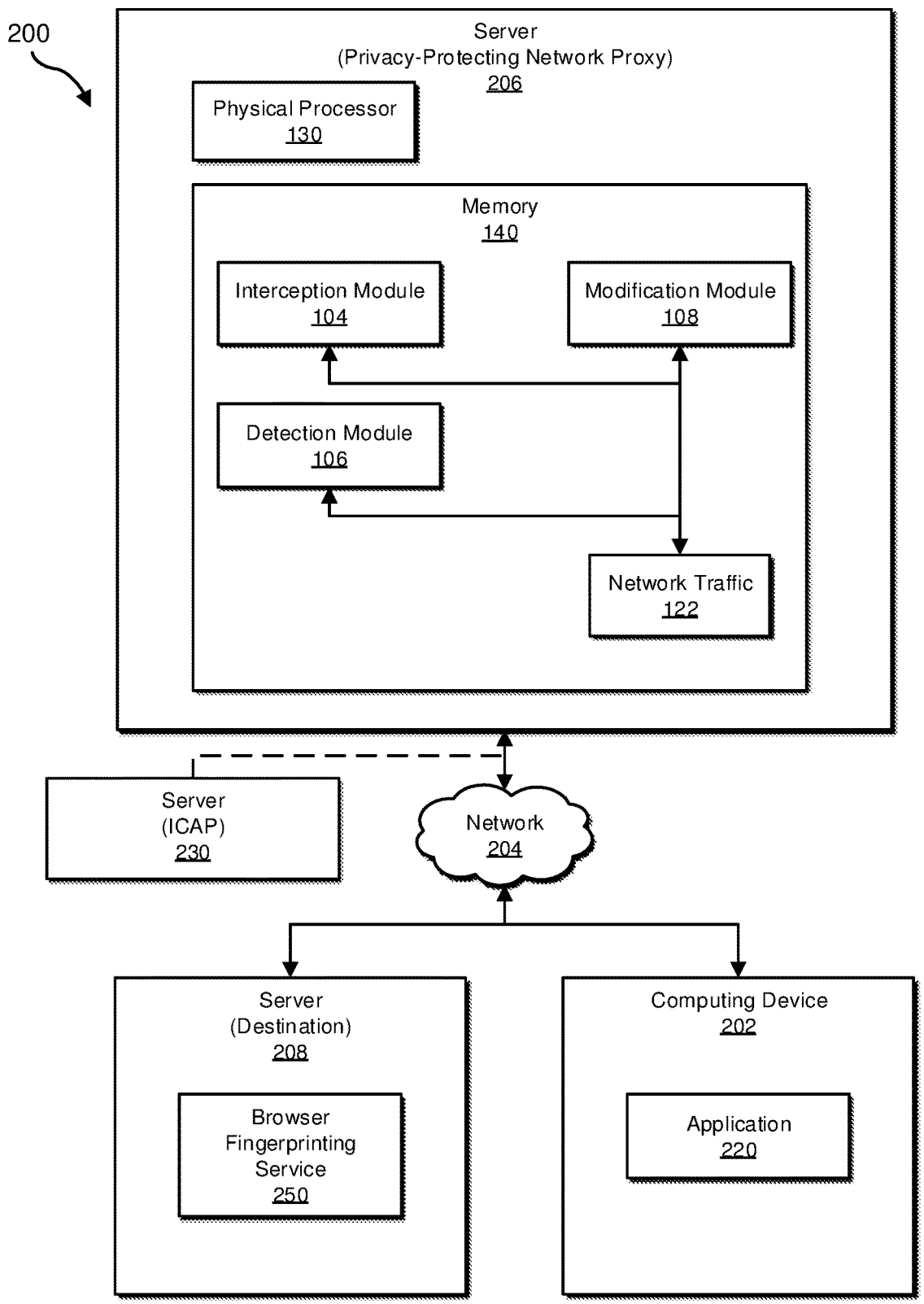
FIG. 2 is a block diagram of an additional example system for enhancing user privacy.

The following will provide, with reference to FIGS. 1-2, detailed descriptions of example systems for enhancing user privacy. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for enhancing user privacy. As illustrated in this figure, example system 100 may include one or more modules 102 for performing one or more tasks. For example, and as will be explained in greater detail below, example system 100 may include an interception module 104 that intercepts, as a part of a privacy-protecting network proxy, network traffic 122 between a client device and a server device, the client device being protected by a network-based privacy solution that inhibits browser fingerprinting through the privacy-protecting network proxy. Example system 100 may additionally include a detection module 106 that detects, as a part of the privacy-protecting network proxy, that network traffic 122 indicates an attempt by a browser fingerprinting service to perform browser fingerprinting on the client device. Example system 100 may also include a modification module 108 that modifies, at the privacy-protecting network proxy based on the detecting of the attempt to perform browser fingerprinting, the intercepted network traffic 122 such that browser fingerprinting performed by the browser fingerprinting service is at least partially inhibited. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enhancing user privacy. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to enhance user privacy.

For example, and as will be described in greater detail below, interception module 104 may intercept, as a part of a privacy-protecting network proxy that corresponds to server 206, network traffic 122 between a client device, which may correspond to computing device 202, and a server device, which may correspond to a server 208. In these examples, computing device 202 may be protected by a network-based privacy solution that inhibits browser fingerprinting through server 206. Detection module 106 may detect, as a part of server 206, that network traffic 122 indicates an attempt by a browser fingerprinting service 250 to perform browser fingerprinting on computing device 202. Modification module 108 may modify, as a part of server 206 and based on the detecting of the attempt to perform browser fingerprinting, the intercepted network traffic 122 such that browser fingerprinting performed by browser fingerprinting service 250 is at least partially inhibited.

FIG. 2 illustrates an embodiment in which modules 102 are disposed within a typical network proxy device corresponding to server 206. Nevertheless, in additional or alternative examples, one or more of detection module 106 and/or modification module 108 may be disposed within a server 230, which may perform additional processing on the behalf of server 206. For example, server 230 may communicate with server 206 according to the Internet Content Adaptation Protocol such that server 230 effectively expands or supplements the functionality provided by server 206 as a proxy. In these examples, one or more of server 206 and server 230 may correspond to the privacy-protecting network proxy of method 300, as discussed below. Additionally, FIG. 2 also illustrates how computing device 202 may be executing an application 220, which may be the application generating or initiating network traffic 122.

Computing device 202 generally represents any type or form of computing device capable of reading computer-executable instructions. In some illustrative examples, computing device 202 may correspond to a personal or recreational mobile computing device that a user uses within a home environment, for example. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing method 300 or facilitating the performance of method 300, as discussed below in connection with FIG. 3. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
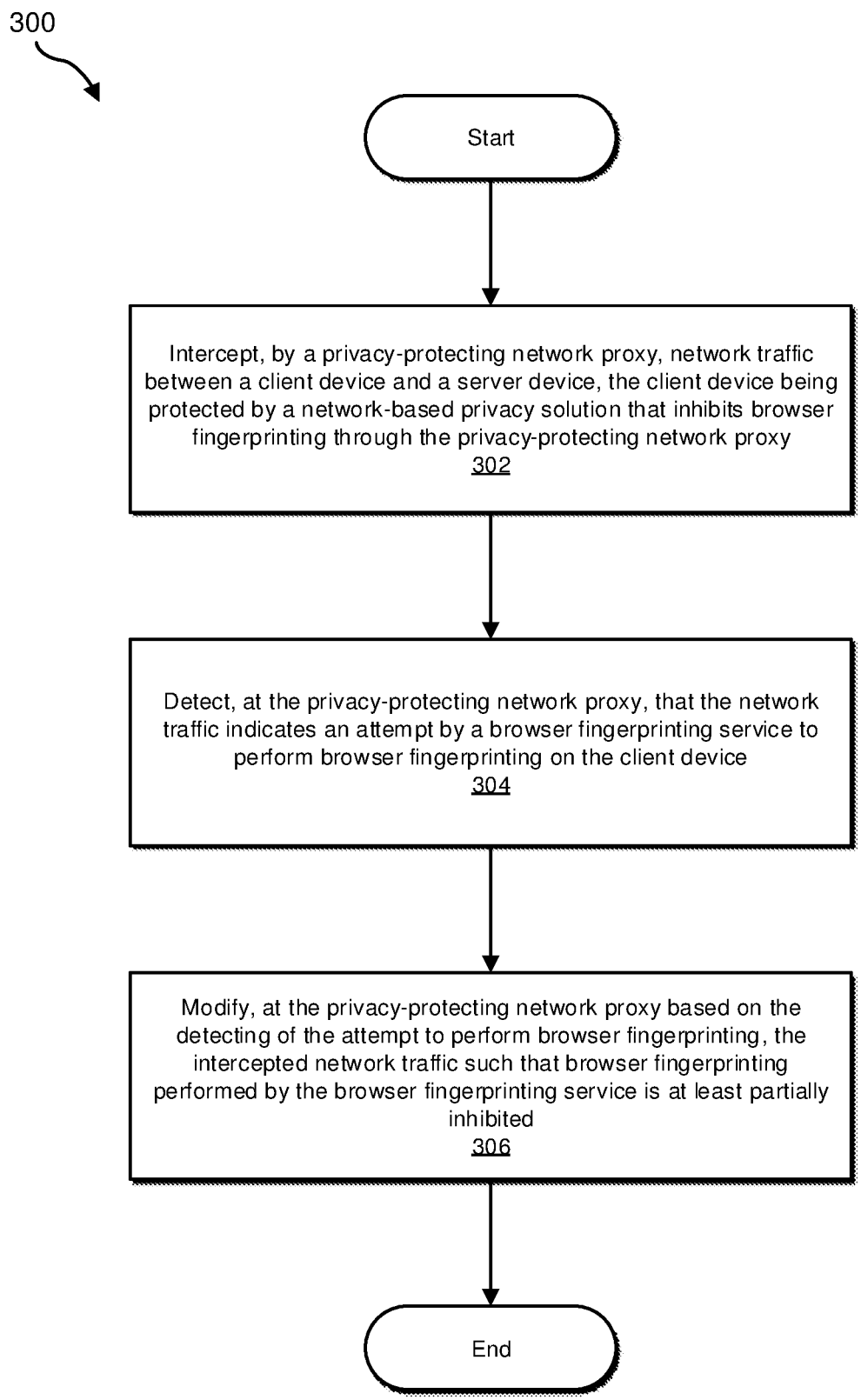
FIG. 3 is a flow diagram of an example method for enhancing user privacy.

FIG. 3 is a flow diagram of an example computer-implemented method 300 for enhancing user privacy. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may intercept, as a part of a privacy-protecting network proxy, network traffic between a client device and a server device, the client device being protected by a network-based privacy solution that inhibits browser fingerprinting through the privacy-protecting network proxy. For example, interception module 104 may, as a part of server 206, intercept network traffic between a client device and a server device, the client device being protected by a network-based privacy solution that inhibits browser fingerprinting through the privacy-protecting network proxy.

As used herein, the term "privacy-protecting network proxy" generally refers to a network proxy that is configured to provide at least one item of functionality to protect the privacy of a corresponding user. Moreover, as used herein, the term "network proxy" generally refers to an intermediary network device that may intercept or view network traffic between a source and destination, while also optionally applying one or more policies to the network traffic, including policies for network security and/or privacy-protection purposes.

As used herein, the term "browser fingerprinting" generally refers to extracting identifying information from and/or about a browser executing at a client device to help uniquely identify the client device and/or a corresponding user. Furthermore, as used herein, the term "network-based privacy solution" generally refers to a technological solution that protects the user's privacy at least in part using primarily a network proxy device, as discussed above, as distinct from privacy solutions that primarily execute within a source client device and/or server destination device. In other words, the functionality used to protect the user's privacy may be embedded within one or more intermediary network nodes in between a source and destination to thereby apply one or more privacy-protecting policies to corresponding network traffic from the source to the destination. The use of network-based privacy solutions as distinct from client-based privacy solutions may provide a number of benefits over related technology, including eliminating a cumbersome process for a user to customize or configure a client-side privacy solution, as well as enabling the same single network proxy device to provide privacy-protecting functionality to protect multiple different client devices. In particular, client-based solutions may vary from one browser type to the next (e.g., the solution for the FireFox browser is not entirely the same as the solution made for the Internet Explorer browser). The effectiveness of these different client-based solutions varies as well. In contrast, network-based solutions may be effectively or substantially browser-agnostic, in the sense that these solutions may provide substantially the same protection and benefits regardless of which browser the end-user may be using.

Interception module 104 may perform step 302 in a variety of ways. Generally speaking, interception module 104 may intercept the network traffic at least in part by a network path between computing device 202 and server 208 being configured such that server 206 corresponds to an in-line or intermediary device through which the network traffic passes en route to server 208 as the destination. In some examples, this may be achieved by simply configuring computing device 202 to transmit the network traffic to server 206 and route the network traffic to a destination such as server 208. Additionally, or alternatively, this may be achieved by physically or otherwise disposing server 206 along the network path between computing device 202 and server 208. Disposing or configuring server 206 as an intermediary network node along the network path between computing device 202 and server 208 may enable server 206 to potentially decrypt corresponding network traffic and/or apply one or more policies, including security-specific and/or privacy-protecting policies, as discussed in more detail below.

In some examples, interception module 104 may perform step 302 at least in part by intercepting the network traffic through a Hypertext Transfer Protocol proxy. For example, the use of the Hypertext Transfer Protocol proxy may be involved in the embodiments corresponding to workflow 502 and workflow 504 of FIG. 5, as discussed in more detail below in connection with steps 304-306.

Figure 4:
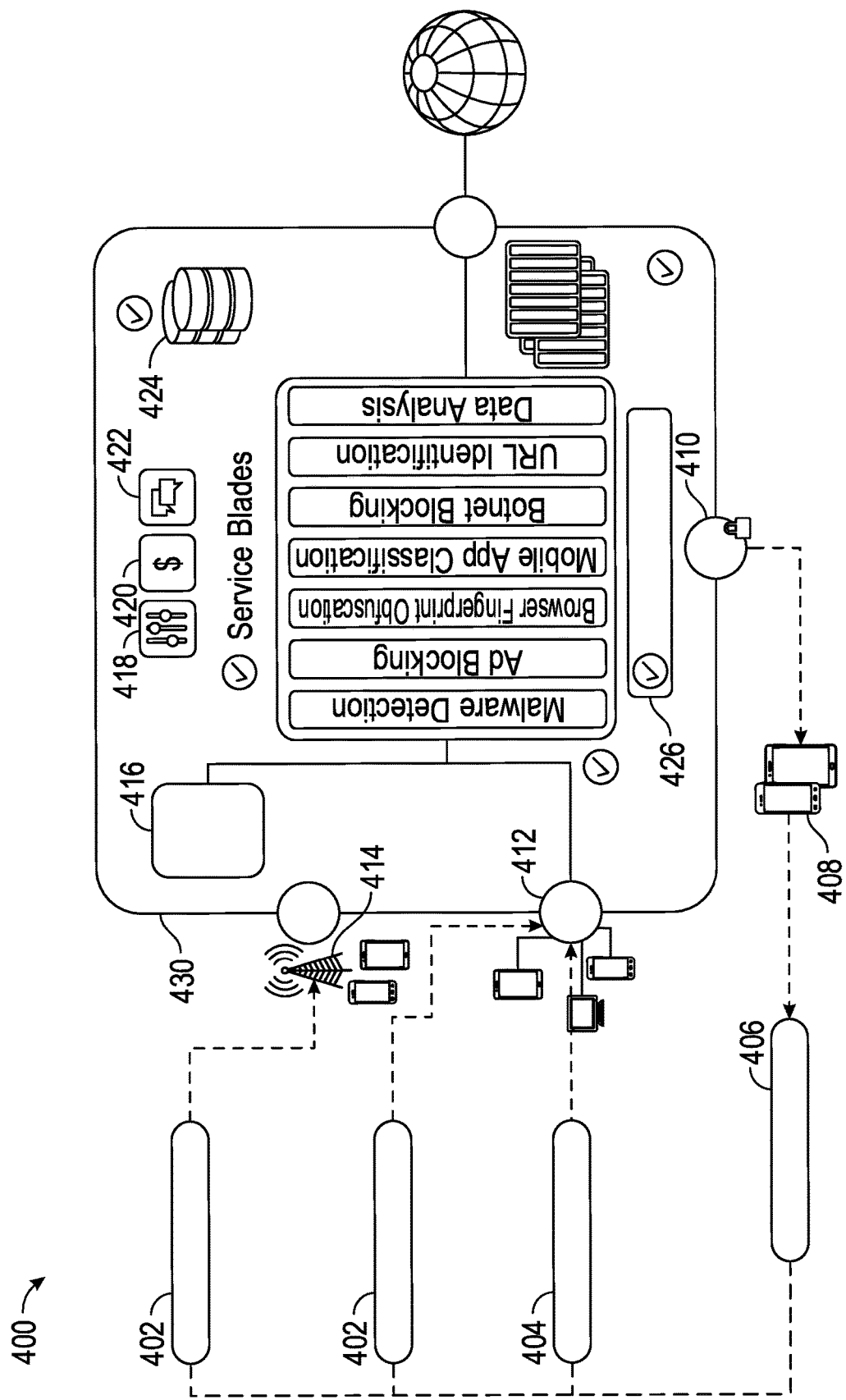
FIG. 4 shows an example workflow for enhancing user privacy.

FIG. 4 shows an illustrative workflow 400 corresponding to method 300, and shown within a larger environment of security solutions and protections that may be provided by a security provider such as NortonLifeLock. As further shown in this figure, a mobile device security protection product 402 may connect to the Internet or other network through a 5G/LTE connection 414, a Gateway GPRS Support Node (GGSN) or a Packet Data Network Gateway (P-GW) connection 416, and/or a direct connection or virtual private network gateway connection 412. The mobile device security protection product 402 may correspond to NORTON MOBILE SECURITY, for example. Additionally, a home device security protection product 404 may similarly connect to the Internet through the direct connection or virtual private network gateway connection 412. Users operating one or more computing devices through these connections may engage in user engagement 406, and network traffic may be generated by, or monitored by, one or more partner or security provider applications 408. Applications 408 may receive network traffic through public application programming interface services 410, which may be provided by application programming interface servers 426.

Through the connections outlined above, a security package 430 may be applied by the security provider to benefit and/or protect a corresponding user. For example, security package 430 may interface with mobile network operator services, including quality of service services 418, billing services 420, and/or short message service services 422. Additionally, security package 430 may apply one or more of a multitude of different services further shown in this figure, including malware detection, ad blocking, browser fingerprinting obfuscation, mobile application classification, botnet blocking, uniform resource locator identification, and/or data analysis. One or more of these services may be provided through corresponding service blades.

In the context of this application one or more of modules 102 may be disposed as part of the browser fingerprinting obfuscation service shown in FIG. 4. In particular, at step 302, interception module 104 disposed within server 206 may intercept network traffic 122 which may originate from one or more of the network connections 412, 414, and/or 416, such that browser fingerprinting obfuscation is performed by a corresponding service blade shown in FIG. 4. Security package 430 may also store one or more items of security-relevant information within a data lake 424, as further shown in this figure. At the end of workflow 400, and after application of one or more policies through the service blades listed above, safe traffic may be allowed to the Internet and from the Internet. Moreover, multiple instances of backend security modules may help ensure always-on scalability.

At step 304, one or more of the systems described herein may detect, at the privacy-protecting network proxy, that the network traffic indicates an attempt by a browser fingerprinting service to perform browser fingerprinting on the client device. For example, detection module 106 may, as part of server 206, detect, that network traffic 122 indicates an attempt by browser fingerprinting service 250 to perform browser fingerprinting on the client device.

Detection module 106 may perform step 304 in a variety of ways. In some examples, detection module 106 may detect that the network traffic indicates the attempt by the browser fingerprinting service to perform browser fingerprinting on the client device by detecting that the client device is attempting to upload data to the browser fingerprinting service at a network location that is previously categorized as being substantially directed to collecting browser fingerprinting data. In these examples, modification module 108 may respond to this detection of the attempt to upload data to the browser fingerprinting service by simply blocking the upload, as further discussed below in connection with step 306 of method 300 and step two of workflow 506 of FIG. 5. In particular, at step two of workflow 506, a Hyper Transfer Protocol POST or GET message or query may be blocked. These messages may be blocked through the use of a Hypertext Transfer Protocol proxy, which may correspond to server 206 in this example of workflow 506. Alternatively, in an example of workflow 506 where server 206 corresponds to an in-line device that is not necessarily decrypting a network payload, one or more connections to server 208 may be blocked based on a Transport Layer Security (TLS) Server Name Indication (SNI) and/or an SSL certificate common name. Moreover, in the example of encrypted network traffic, without decryption procedures, users may still benefit from the blocking of corresponding connections, which may be performed by examining a subject field in an SSL certificate or other encryption certificate, thereby providing detection module 106 with information indicating a uniform resource locator or domain for the connection, which can be checked against a list of known browser fingerprinting domains, as discussed above.

Figure 5:
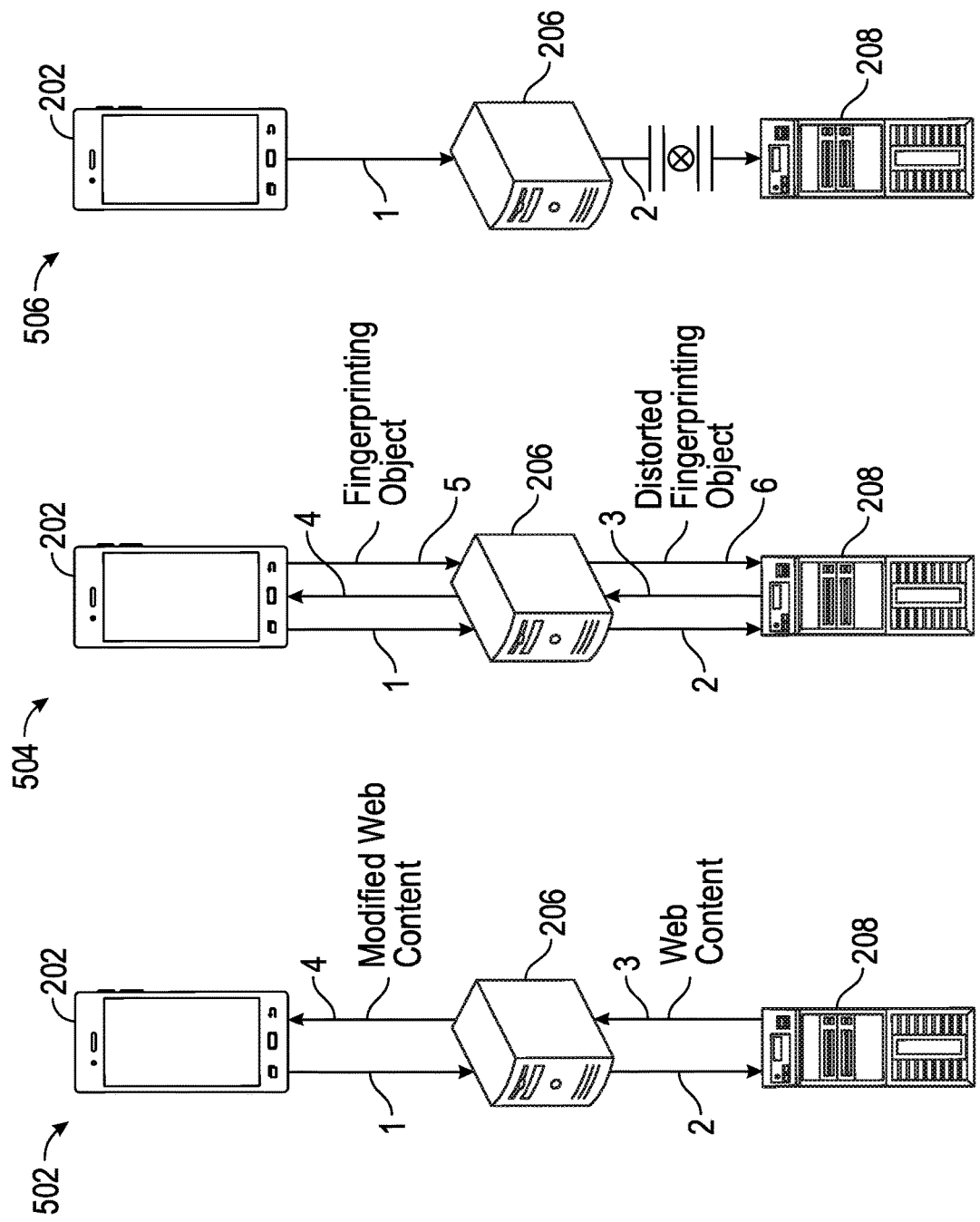
FIG. 5 shows a set of three timing diagrams corresponding to an example method for enhancing user privacy.

FIG. 5 shows an illustrative workflow 502, illustrative workflow 504, and an illustrative workflow 506 of various embodiments of method 300. In some examples, one or more of these different workflows may be combined or supplemented with each other, or otherwise overlapped, in the performance of method 300. In particular, workflow 506 shows an illustrative workflow in a scenario where the client device is attempting to upload data to the browser fingerprinting service at a network location that is previously categorized as being substantially directed to collecting browser fingerprinting data. In workflow 506, at step one computing device 202 may transmit data to a network destination, which may correspond to server 208. On the way to server 208, server 206 may first intercept the request transmitted by computing device 202. At server 206, detection module 106 may detect that the data transmitted at step one is directed to server 208, and further detect that server 208 corresponds to a server that entirely or substantially performs browser fingerprinting services. Detection module 106 may perform this detecting step simply by examining one or more outer layers of a corresponding network packet that identifies an Internet Protocol address or other identifier of server 208, without necessarily decrypting one or more payloads that are encrypted within the network packet according to an encryption protocol such as SSL or TLS. In one embodiment, the network location may include a domain for the browser fingerprinting service. For example, some domains may be known to serve no purpose other than to gather analytics and/or fingerprinting data. Additionally, or alternatively, the network location may be listed on a crowdsourced list of network locations that are categorized as being substantially directed to collecting browser fingerprinting data. Such crowdsourced lists may be maintained and/or managed by services such as DISCONNECT or DUCKDUCKGO TRACKER RADAR. Additionally, or alternatively, these public lists may be supplemented by additional lists of fingerprinting network locations identified by security analysts or researchers, such as those at NortonLifeLock. Accordingly, at step two of workflow 506, modification module 108 may effectively block the transmission of the data transmitted at step one.

In view of the above, in these examples, modules 102 may effectively block the uploading of data, including fully encrypted data, simply based on a determination that the data has been transmitted to a browser fingerprinting service, and without necessarily decrypting the data to view its contents. Workflow 502 may thereby be distinguished in some sense from workflow 504 and workflow 506, because these additional workflows may involve one or more decryption procedures at server 206 to apply one or more policies to the decrypted network traffic, as discussed in more detail below. Moreover, workflow 502 and workflow 504 may involve substantive modification of network traffic 122, as distinct from simply blocking network traffic 122, and therefore will be discussed more prominently in connection with step 306 of method 300, as discussed below.

At step 306, one or more of the systems described herein may modify, at the privacy-protecting network proxy based on the detecting of the attempt to perform browser fingerprinting, the intercepted network traffic such that browser fingerprinting performed by the browser fingerprinting service is at least partially inhibited. For example, modification module 108 may modify, at server 206 and based on the detecting of the attempt to perform browser fingerprinting, the intercepted network traffic 122 such that browser fingerprinting performed by browser fingerprinting service 250 is at least partially inhibited.

Modification module 108 may perform step 306 in a variety of ways. In some examples, modification module 108 may modify the intercepted network traffic by injecting a script into a network payload that is directed to the client device. In some examples, the script may correspond to JavaScript code, and this JavaScript code may be injected within a Hypertext Markup Language payload. Returning to FIG. 5, workflow 502 illustrates a scenario whereby modification module 108 may modify the intercepted network traffic. In particular, workflow 502 may begin with step one, whereby computing device 202 may request some web content from a Web server, such as server 208. At step two, server 206, as a proxy, may forward the request for the web content from server 208. At step three, server 208 may satisfy the request by transmitting web content directed to computing device 202. Nevertheless, prior to arriving at computing device 202, the web content transmitted from server 208 may be intercepted by server 206. Accordingly, after step three of workflow 502, modification module 108 at server 206 may effectively modify the web content received from server 208. For example, modification module 108 may inject a script into a network payload or web content that is directed to computing device 202. In some examples, the network payload may include a Hypertext Markup Language payload (e.g., corresponding to web content). Additionally, or alternatively, in some examples the script overrides an application programming interface call configured to collect fingerprinting information.

Multiple examples of simple overrides may be implemented by modification module 108. For example, modification module 108 may override a canvas function (e.g., a toDataUrl( ) canvas function). Modification module 108 may, in these examples, optionally randomize the canvas fingerprint and/or otherwise distort the canvas fingerprint. Additionally, or alternatively, modification module 108 may tweak or alter a browser's screen object so that the corresponding dimensions are slightly randomized and/or rounded off.

In some examples, modification module 108 may modify the intercepted network traffic by obfuscating a fingerprinting object that the client device is attempting to upload to the server device. Workflow 504 illustrates a scenario that may correspond to this embodiment. Step one and step two of workflow 504 may parallel step one and step two of workflow 502, and these steps may illustrate how computing device 202 may request an item of web content from a Web server, such as server 208. Similarly, step three and step four of workflow 504 may resemble step three and step four of workflow 502 in the sense that the web content is forwarded to computing device 202 by server 206. Nevertheless, in the example of workflow 504, modification module 108 may optionally omit the modification of the web content transmitted at step three and step four. Instead, modification module 108 may allow web content to be transmitted to computing device 202, even if this web content includes one or more functions, scripts, and/or features that predictably will extract browser fingerprinting information from computing device 202. Accordingly, modification module 108 may expect this web content to successfully extract one or more items of browser fingerprinting information, which may be transmitted at step five as a fingerprinting object. Research by security analysts (e.g., at NortonLifeLock) have established that 30+ different third-party browser fingerprinting technologies may exist to generate such fingerprinting objects. Moreover, browser fingerprinting services that are based on these different scripts may be sold to thousands of websites. Furthermore, many of these scripts share a common technological DNA, and detection module 106 may thereby identify them when intercepted by interception module 104. As used herein, the term "common technological DNA" refers to coding content that has been categorized as having been previously found (i.e., before the performance of method 300) essentially the same in multiple different and independent browser fingerprinting services.

These scripts typically upload the fingerprinting object using either a Hypertext Transfer Protocol GET query string (e.g., where the GET message contains the browser fingerprint in the uniform resource locator query string) and/or a Hypertext Transfer Protocol POST message (e.g., which contains an item of text or a JavaScript Object Notation (JSON) document). Accordingly, in these examples, a Hypertext Transfer Protocol proxy, such as server 206, can identify these uploads based on a combination of factors and then modification module 108 may modify the payload to obfuscate the fingerprint. The identification factors may include a method, host domain, path, and/or query string. Moreover, usage of the Hypertext Transfer Protocol Proxy may effectively decrypt network traffic to determine a uniform resource locator domain, the corresponding method, and/or whether there is a query string present. In the case of a domain that is known to fingerprint users, the request can be blocked, especially if the request is exfiltrating data via the POST method or a GET query string.

Nevertheless, as further shown in workflow 504, the fingerprinting object transmitted at step five may be intercepted by server 206 and modification module 108 may effectively modify or distort the fingerprinting object to reduce or eliminate its value in terms of uniquely identifying computing device 202 and/or a corresponding user. The uploading at step five may be performed by transmitting a hypertext transfer protocol POST request.

The modification by modification module 108 after step five may be relatively minor and/or quite substantial, and even relatively minor modifications may nevertheless effectively ruin the fingerprinting value of the fingerprinting object transmitted by computing device 202. At step six, modification module 108 may forward the distorted fingerprinting object rather than forwarding the original and unmodified fingerprinting object, such that server 208 receives the distorted fingerprinting object, which may prove to be worthless from a browser fingerprinting perspective, as discussed above.

Illustrative examples of the fingerprinting object modified by modification module 108 after step five of workflow 504 may include: a canvas fingerprint, a font list, screen dimensions, a user agent screen, a plug-in list, a webGL fingerprint, and/or an AudioContext fingerprint. A canvas fingerprint may refer to a fingerprinting script drawing of an invisible image using a Hypertext Markup Language version 5 canvas application programming interface, and then obtaining a 128-bit hash of the image using an additional application programming interface call (e.g., toDataUrl( )) where this hash may be quite unique and the hash may be used to identify a user's browser. A font list may refer to the list of all fonts that are installed on a user system. In recent years, browsers such as Firefox, Tor, and Safari have worked to mitigate the effectiveness of the fonts as a source of browser entropy by only exposing the factory-default fonts. Screen dimensions may refer to screen properties that may be stored in a JavaScript screen object. The user agent string may refer to the user agent that is stored in the JavaScript navigator object. The plug-in list may refer to a list of plug-ins installed by the user. Quite often, an out of date plug-in can boost the uniqueness of the fingerprint. A webGL fingerprint may be extracted by probing the capability of the webGL on the user system. An AudioContext fingerprint may be similar to the canvas fingerprint, but may be applied to the user system audio stack. In order to successfully modify and/or block one or more of the fingerprinting objects listed above, it may be helpful for the corresponding fingerprinting object to be interceptable (e.g., can the object be successfully identified and/or extracted?) and safe (e.g., can the modification or blocking of the fingerprinting object be performed without breaking partially or entirely the functionality of corresponding web content?).

With respect to the canvas fingerprint, a script (e.g., JavaScript) can be inserted into the requested webpage that performs the following steps. Scripts may reimplement the toDataUrl( ) canvas application programming interface function calls. When these application programming interfaces are now called, a function (e.g., manipulate( )) may capture the canvas image. Additionally, this function may furthermore generate a random shift value between two integers (e.g., between 5 and 15), step diagonally through the pixel map and select 10 pixels, shift the RGP color values for these 10 pixels, and/or call the original application programming interface function (e.g., toDataUrl( )) and return the value for the slightly modified image. The usage of this script will essentially guarantee that the canvas fingerprint will change each time. Most of the browser settings listed above can be intercepted and modified.

The various embodiments of the subject matter outlined above may improve upon related technology in a variety of ways. All of the current defenses against browser fingerprinting may request for the end-user to install extensions and/or make configuration changes to all of the browsers that may be installed on a particular device. In contrast, a network-based solution corresponding to method 300 may eliminate all of this complex software configuration. Additionally, some mobile applications may contain an embedded browser that can only be prevented from performing fingerprinting of users through the use of a network-based service corresponding to method 300, due to the fact that these embedded browsers may prevent users from installing and/or configuring browser extensions or settings to prevent these procedures locally on the client device. In other words, without the network-based solution outlined above in connection with method 300, related technology cannot inhibit the tracking of users through browser fingerprints with such a minimal amount of configuration on the end-user device (e.g., the only local client device configuration involved in method 300 may include a user logging into and/or signing up for an online service that triggers the performance of method 300 through server 206). In the case of a mobile application that provides an embedded browser that cannot be configured, then the solution corresponding to method 300 may be the only solution that can prevent an application provider from fingerprinting a user. The embedded web browsers may be provided through implementations such as WEBKIT and ALAMOFIRE. The mobile application provider can share the fingerprint and corresponding identity due to the fact that the user is likely logged in to the corresponding application. Generally speaking, the solution corresponding to method 300 may, in some examples, constitute a key technological pillar in a cloud-centric deployment of security protections.

Figure 6:
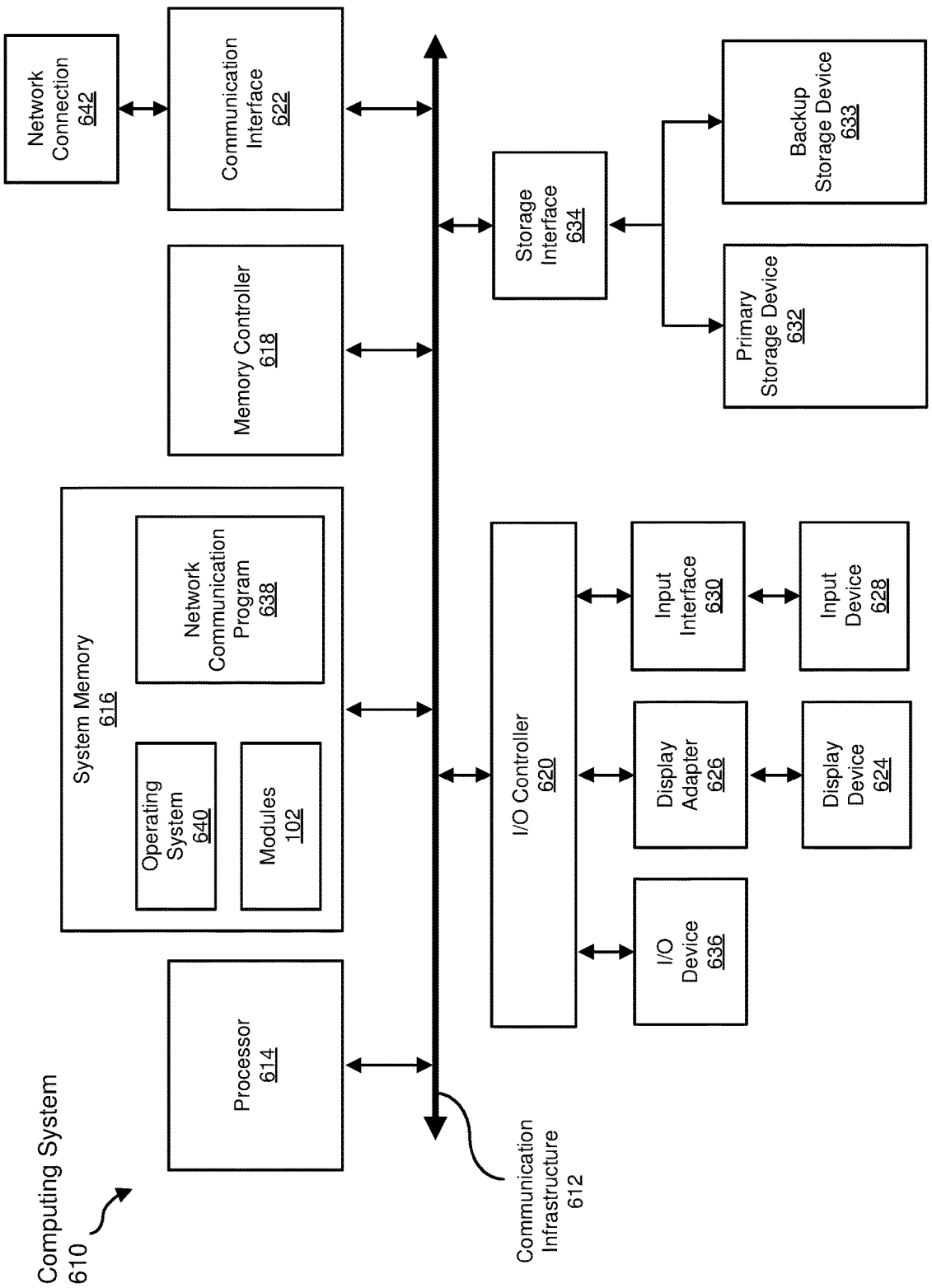
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
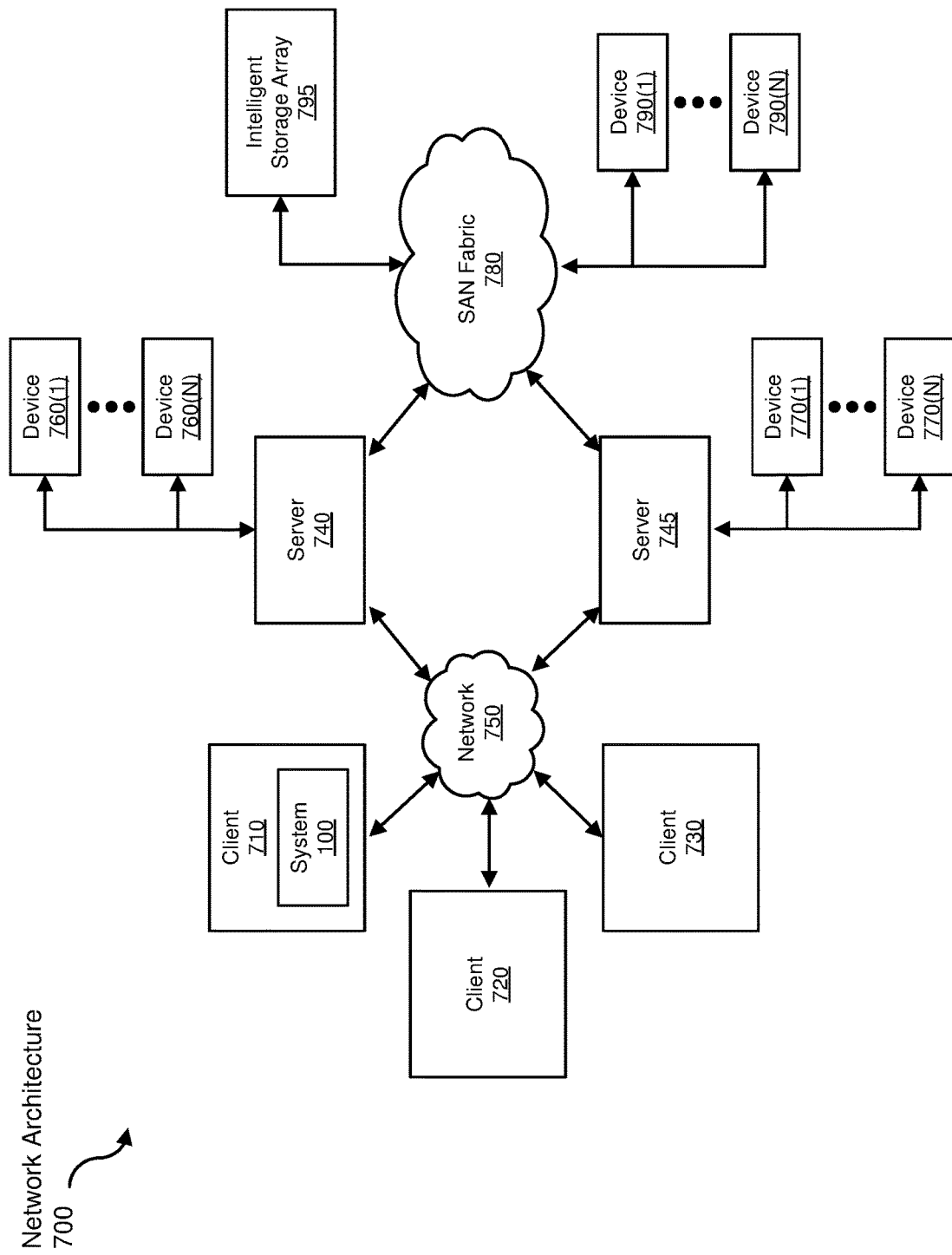
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enhancing user privacy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enhancing user privacy, at least a portion of the method being performed by a computing device comprising at least one processor, the method comprising:

intercepting, by a privacy-protecting network proxy, network traffic between a client device and a server device, the client device being protected by a network-based privacy solution that inhibits browser fingerprinting through the privacy-protecting network proxy;

detecting, at the privacy-protecting network proxy, that the network traffic indicates an attempt by a browser fingerprinting service to perform browser fingerprinting on the client device; and modifying, at the privacy-protecting network proxy based on the detecting of the attempt to perform browser fingerprinting, the intercepted network traffic such that browser fingerprinting performed by the browser fingerprinting service is at least partially inhibited;

wherein:

the detecting comprises at least one of:

detecting that the client device is attempting to upload data, through at least one unencrypted packet, to the browser fingerprinting service at a network location that is previously categorized as being directed to collecting browser fingerprinting data; or examining an outer layer of a network packet with an encrypted payload, the outer layer identifying the network location that is previously categorized as being directed to collecting browser fingerprinting data;

the modifying comprises at least one of:

injecting a script into a network payload that is directed to the client device, the script overriding an application programming interface call that is configured to collect fingerprinting information; or modifying the intercepted network traffic by obfuscating a fingerprinting object that the client device is attempting to upload to the browser fingerprinting service.

2. The computer-implemented method of claim 1, wherein the network location comprises a uniform resource locator for the browser fingerprinting service.

3. The computer-implemented method of claim 2, wherein the network location comprises a domain for the browser fingerprinting service.

4. The computer-implemented method of claim 2, wherein the network location is listed on a crowdsourced list of network locations that are categorized as being substantially directed to collecting browser fingerprinting data.

5. The computer-implemented method of claim 1, wherein intercepting the network traffic between the client device and the server device comprises intercepting the network traffic through a Hypertext Transfer Protocol proxy.

6. The computer-implemented method of claim 5, wherein the script corresponds to JavaScript code.

7. The computer-implemented method of claim 6, wherein the network payload comprises a Hypertext Markup Language payload.

8. The computer-implemented method of claim 6, wherein the script overrides a canvas function.

9. The computer-implemented method of claim 5, wherein modifying the intercepted network traffic comprises obfuscating a fingerprinting object that the client device is attempting to upload to the server device.

10. The computer-implemented method of claim 1, wherein inhibiting fingerprinting performed by the browser fingerprinting service is performed in a manner that is browser-agnostic.

11. A system for enhancing user privacy, the system comprising:
   an interception module, stored in a memory, that intercepts, as a part of a privacy-protecting network proxy, network traffic between a client device and a server device, the client device being protected by a network-based privacy solution that inhibits browser fingerprinting through the privacy-protecting network proxy;
   a detection module, stored in the memory, that detects, as a part of the privacy-protecting network proxy, that the network traffic indicates an attempt by a browser fingerprinting service to perform browser fingerprinting on the client device;
   a modification module, stored in the memory, that modifies, at the privacy-protecting network proxy based on the detecting of the attempt to perform browser fingerprinting, the intercepted network traffic such that browser fingerprinting performed by the browser fingerprinting service is at least partially inhibited; and
   at least one physical processor configured to execute the interception module, the detection module, and the modification module;
   wherein:
   the detection module is configured to perform the detecting by performing at least one of:
      detecting that the client device is attempting to upload data, through at least one unencrypted packet, to the browser fingerprinting service at a network location that is previously categorized as being directed to collecting browser fingerprinting data; or
      examining an outer layer of a network packet with an encrypted payload, the outer layer identifying the network location that is previously categorized as being directed to collecting browser fingerprinting data;
   the modification module is configured to perform the modifying by performing at least one of:
      injecting a script into a network payload that is directed to the client device, the script overriding an application programming interface call that is configured to collect fingerprinting information; or
      modifying the intercepted network traffic by obfuscating a fingerprinting object that the client device is attempting to upload to the browser fingerprinting service.

12. The system of claim 11, wherein the network location comprises a uniform resource locator for the browser fingerprinting service.

13. The system of claim 12, wherein the network location comprises a domain for the browser fingerprinting service.

14. The system of claim 12, wherein the network location is listed on a crowdsourced list of network locations that are categorized as being substantially directed to collecting browser fingerprinting data.

15. The system of claim 11, wherein the interception module intercepts the network traffic between the client device and the server device at least in part by intercepting the network traffic through a Hypertext Transfer Protocol proxy.

16. The system of claim 15, wherein the script corresponds to JavaScript code.

17. The system of claim 16, wherein the network payload comprises a Hypertext Markup Language payload.

18. The system of claim 16, wherein the script overrides a canvas function.

19. The system of claim 15, wherein the detection module detects that the network traffic indicates the attempt by the browser fingerprinting service to perform browser fingerprinting based at least in part on the detection module detecting an instance of common technological DNA that has been previously detected in multiple different and independent browser fingerprinting scripts.

20. A non-transitory computer-readable medium comprising one or more computer-readable instructions that, when executed by at least one processor of a computing device, cause the computing device to:
   intercept, by a privacy-protecting network proxy, network traffic between a client device and a server device, the client device being protected by a network-based privacy solution that inhibits browser fingerprinting through the privacy-protecting network proxy;
   detect, at the privacy-protecting network proxy, that the network traffic indicates an attempt by a browser fingerprinting service to perform browser fingerprinting on the client device; and
   modify, at the privacy-protecting network proxy based on the detecting of the attempt to perform browser fingerprinting, the intercepted network traffic such that browser fingerprinting performed by the browser fingerprinting service is at least partially inhibited;
   wherein:
   the detecting comprises at least one of:
      detecting that the client device is attempting to upload data, through at least one unencrypted packet, to the browser fingerprinting service at a network location that is previously categorized as being directed to collecting browser fingerprinting data; or
      examining an outer layer of a network packet with an encrypted payload, the outer layer identifying the network location that is previously categorized as being directed to collecting browser fingerprinting data;
   the modifying comprises at least one of:
      injecting a script into a network payload that is directed to the client device, the script overriding an application programming interface call that is configured to collect fingerprinting information; or
      modifying the intercepted network traffic by obfuscating a fingerprinting object that the client device is attempting to upload to the browser fingerprinting service.

* * * * *